No. 651,316. Patented June 5, 1900.
W. & A. SMITH.
BICYCLE PROPELLING MECHANISM.
(Application filed Aug. 2, 1899.)
(No Model.)

Witnesses:
J. Ed. Page
Horace S. Deitz

William Smith
Alphonse Smith
Inventor
By Marion & Marion
Attorneys

United States Patent Office.

WILLIAM SMITH, OF LA BAIE, AND ALPHONSE SMITH, OF MADDINGTON FALLS, CANADA, ASSIGNORS OF ONE-HALF TO HENRY SMITH, OF LOWELL, AND ALFRED SMITH, OF HAVERHILL, MASSACHUSETTS.

BICYCLE PROPELLING MECHANISM.

SPECIFICATION forming part of Letters Patent No. 651,316, dated June 5, 1900.

Application filed August 2, 1899. Serial No. 725,855. (No model.)

*To all whom it may concern:*

Be it known that we, WILLIAM SMITH, of La Baie, and ALPHONSE SMITH, of Maddington Falls, county of Yamaska, Province of Quebec, Canada, subjects of Her Majesty the Queen of Great Britain, have invented certain new and useful Improvements in Bicycle Propelling Mechanisms; and we do hereby declare that the following is a full, clear, and exact description of the invention, such as will enable others skilled in the art to which it appertains to make and use the same.

Our invention relates to improvements in bicycle-propelling mechanisms.

One object of our invention is to provide a propelling mechanism in which the pedals operate in an approximate vertical direction, the guide sprocket-wheels being operated by means of a crank-arm, and pitmen connected with the pedals and drive-shafts.

A further object is to provide a mechanism which is easily moved and durable in construction, which can be made at low cost, which is operated with great ease, and which will obviate to a great extent the deleterious effect caused by bicycle-riding.

To these and other ends, the nature of which will be clearly apparent as the invention is hereinafter disclosed, our invention consists in the improved construction and combination of parts hereinafter fully described, and particularly pointed out in the appended claim.

In the accompanying drawings, forming a part of this specification, similar numerals of reference indicate similar parts in both figures.

Figure 1:
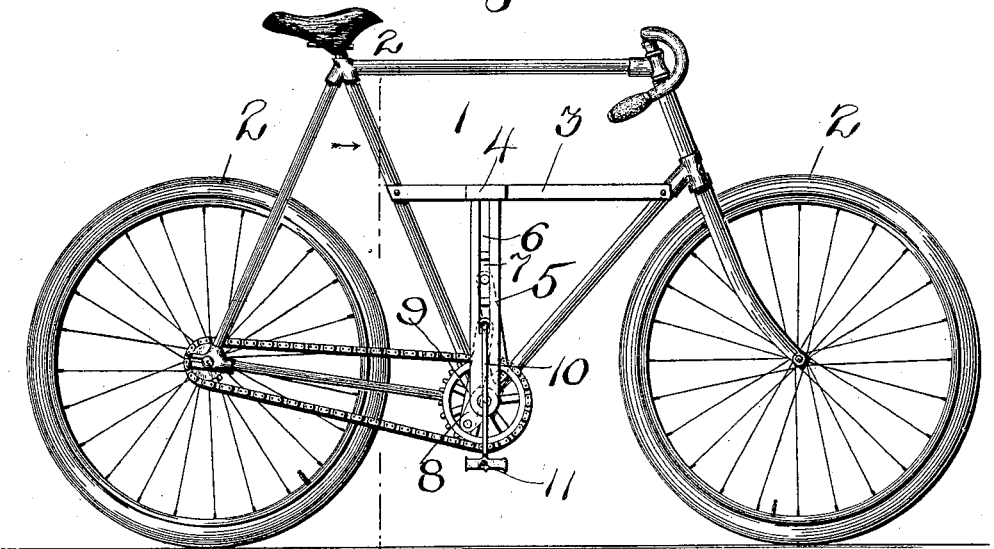
Figure 2:
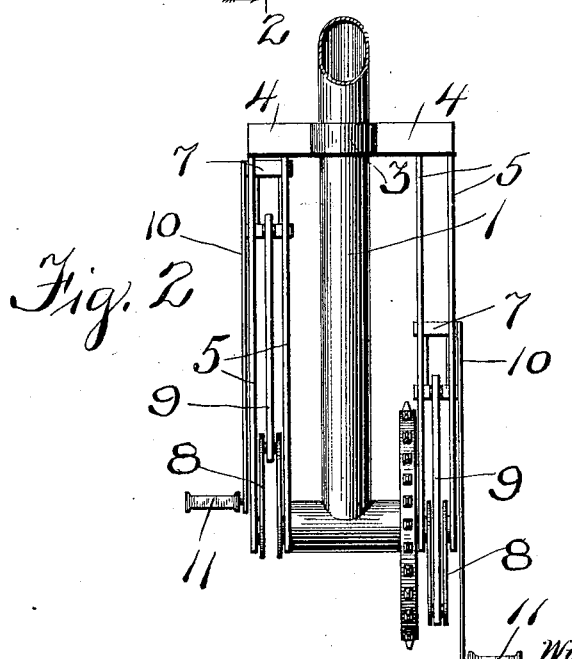

Figure 1 is a side elevation of a bicycle provided with our improved mechanism. Fig. 2 is a vertical sectional view of the same, taken on the line 2 of Fig. 1.

In the drawings, 1 designates the frame of the bicycle, and 2 the wheels, these being provided in the usual manner. As shown in Fig. 1, the frame is provided with a horizontally-extending brace 3, connected in a suitable manner to the frame, which brace is provided with laterally-extending portions 4, from which depend suitable arms 5, the lower ends of which are mounted in alinement with the crank-shaft, the mounting being in any suitable manner, but preferably formed as shown in Fig. 2. The slotted openings 6, formed in the arms 5, are adapted to form slideways for the reception of the slides 7, preferably formed in the manner shown in Fig. 2. A suitable crank-arm 8 is mounted at each end of the crank-shaft and is connected by means of a pitman 9 with the slides 7, the construction being duplicated on opposite sides of the crank-hanger. Each of the slides 7 is provided with a downwardly-extending arm 10, at the lower end of which is mounted the pedal 11.

In operating the bicycle it is necessary only that the rider press downwardly on the proper pedal 11, whereupon the slide 7 is caused to move downwardly in its slideway, thereby causing the pitman 9 to impart a rotary movement to the crank-shaft through the medium of the crank-arm 8, the opposite pedal during this movement moving upward in an obvious manner.

The advantages of this construction are thought to have been clearly set forth and are apparent upon reference being made to the drawings, and it is therefore thought not necessary to set them forth in greater detail.

While we have herein shown a preferred form of carrying our invention into effect, yet we do not desire to limit ourselves to such preferred details of construction, but claim the right to use any and all modifications thereof which will serve to carry into effect the objects to be attained by this invention in so far as such modifications and changes may fall within the spirit and scope of our said invention.

Having now particularly described and ascertained the nature of our said invention and in what manner the same is to be performed, we declare that what we claim is—

The combination with the frame of a bicycle, of the drive sprocket-wheel; a frame secured to the frame of the bicycle and forming vertical guideways arranged one on each side of said sprocket-wheel; a vertically-moving slide mounted in each of said guideways; a crank-arm connected to each end of the sprocket-shaft; a link connecting each of said crank-arms with each of said slides; and a pedal connected with each of said slides, substantially as described.

In witness whereof we have hereunto set our hands in the presence of two witnesses.

WILLIAM SMITH.
ALPHONSE SMITH.

Witnesses:
J. L. BELCOURT,
JOSEPH SMITH.